United States Patent [19]

Jachimowicz et al.

[11] Patent Number: 5,789,733
[45] Date of Patent: Aug. 4, 1998

[54] SMART CARD WITH CONTACTLESS OPTICAL INTERFACE

[75] Inventors: Karen E. Jachimowicz, Laveen; Scott R. Novis, Tempe; Dennis Barry; Wenbin Jiang, both of Phoenix; Michael S. Lebby, Apache Junction, all of Ariz.

[73] Assignee: Motorola, Inc., Schaumburg, Ill.

[21] Appl. No.: 717,058

[22] Filed: Sep. 20, 1996

[51] Int. Cl.$^6$ ............................................. G06K 19/06
[52] U.S. Cl. .......................... 235/492; 235/454; 235/491; 235/380; 359/15
[58] Field of Search ................... 235/492, 435, 235/439, 451, 454, 487, 491, 379, 380; 902/25, 26; 359/1, 2, 15

[56] References Cited

U.S. PATENT DOCUMENTS

| | | | |
|---|---|---|---|
| 3,377,616 | 4/1968 | Auer, Jr. | 235/492 X |
| 4,213,119 | 7/1980 | Ward et al. | 340/151 |
| 4,253,723 | 3/1981 | Kojima et al. | 235/457 |
| 4,310,890 | 1/1982 | Trehn et al. | 364/467 |
| 4,575,621 | 3/1986 | Dreyfus | 235/492 X |
| 4,634,845 | 1/1987 | Hale et al. | 235/379 X |
| 4,689,478 | 8/1987 | Hale et al. | 235/379 X |
| 4,794,585 | 12/1988 | Lee | 369/112 |
| 4,829,166 | 5/1989 | Froelich | 235/492 X |
| 4,837,556 | 6/1989 | Matsushita et al. | 340/310 R |
| 4,916,296 | 4/1990 | Streck | 235/454 |
| 5,050,992 | 9/1991 | Drummond et al. | 359/19 X |
| 5,151,582 | 9/1992 | Fujioka | 235/469 |
| 5,227,859 | 7/1993 | Leib et al. | 359/902 X |
| 5,241,161 | 8/1993 | Zuta | 235/48 X |
| 5,349,210 | 9/1994 | Ackley et al. | 257/8 X |
| 5,432,329 | 7/1995 | O'Boyle et al. | 359/2 X |
| 5,438,403 | 8/1995 | Hoshino et al. | 359/2 X |
| 5,585,957 | 12/1996 | Nakao et al. | 359/250 X |
| 5,606,434 | 2/1997 | Feldman et al. | 359/15 X |

FOREIGN PATENT DOCUMENTS

| | | |
|---|---|---|
| 4-313178 | 11/1992 | Japan. |
| 5-73738 | 3/1993 | Japan. |

*Primary Examiner*—Donald T. Hajec
*Assistant Examiner*—Michael G. Lee
*Attorney, Agent, or Firm*—Eugene A. Parsons

[57] ABSTRACT

An optical smart card (10) including a microchip (14) having information stored thereon, an optical holographic sensor pad (16) capable of detecting and collecting light beams emitted from a remote reader/transmitter (52), a light source (18) capable of emitting dataelectronic information contained on the microchip (14) back to the remote reader/transmitter (52) and electronics (20) connected to the sensor pad (16), the light source (18) and the microchip (14).

12 Claims, 2 Drawing Sheets

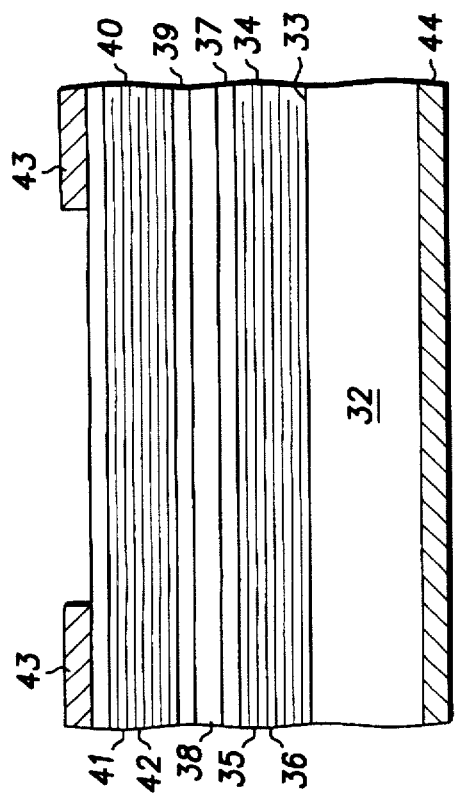
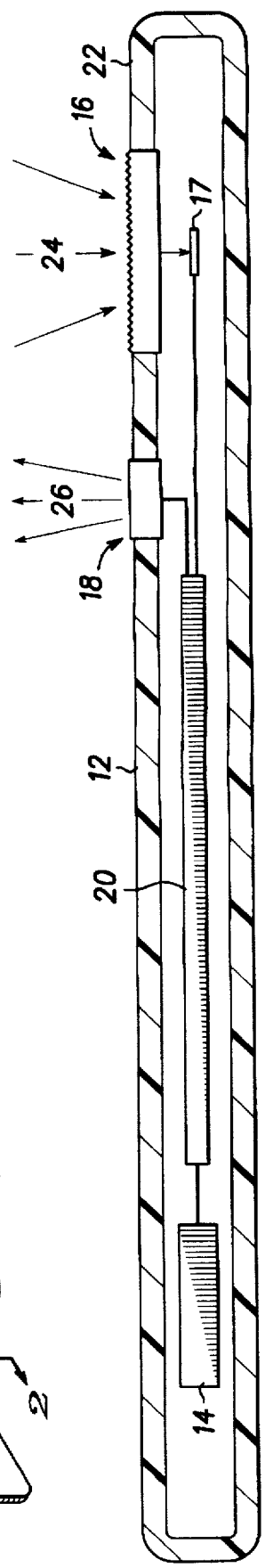
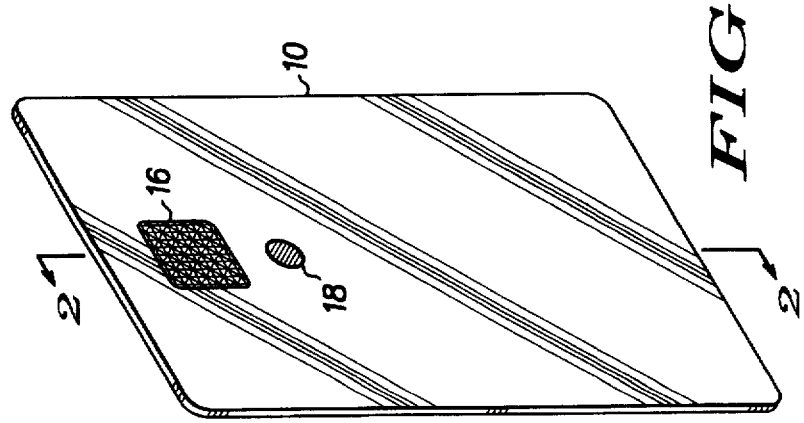

SMART CARD WITH CONTACTLESS OPTICAL INTERFACE

FIELD OF THE INVENTION

The present invention pertains to smart cards and the containment of an optical contact within a smart card.

BACKGROUND OF THE INVENTION

Smart cards are becoming very popular around the world. Generally a smart card is defined as a card (similar in size to a common credit card) containing a semiconductor microchip with some electronics and a memory for storing information. In most instances, smart cards are used to store monetary value, financial data, medical data and other personal information. Of concern in dealing with cards containing these types of information, is the method by which this information is read from the microchip and transmitted to a remote reading device or other remote device. In general, physical contact with the card by the device reading the information is required. This type of physical contact interfacing becomes undesirable in many instances because the physical contact is orientation dependent, slowing down the retrieval of information.

In some instances, non-physical contact with the smart card is utilized for reading the information contained on the microchip, such as through wireless contact. Of concern in utilizing wireless contact is the perceived lack of security, more specifically the interception of the wireless transmission by unauthorized parties, i.e. the wireless pickpocket.

In transactional matters, such as automated fare collection systems, generally physical contact with a smart card by the reading device is common. This type of system slows down the passage of patrons through the system due to the time required for the individual user to properly orientate their smart card and make proper physical contact between their smart card and the reading device. Mass transit authorities and fast ticket transaction oriented companies are looking for a robust, cost effective technology which will enable them to automate their fare collection systems, saving time, and thus making the system more cost effective. In doing so, companies are looking toward the smart card industry. Accordingly, there is a need for a contactless, essentially orientation independent, secure technology which the consumer market feels comfortable and safe using.

It is a purpose of the present invention to provide a new and improved smart card capable of a secure physically contactless interface.

It is yet another purpose of the present invention to provide a new and improved smart card capable of contact with a remote reader/writer through an optical contact.

It is a still further purpose of the present invention to provide an improved smart card that allows for the fast and efficient exchange of information between the smart card and a remote reader/writing device.

It is a purpose of the present invention to provide for a smart card that is easy to operate by the user and energy efficient.

SUMMARY OF THE INVENTION

The above problems and others are at least partially solved and the above purposes and others are realized in an optical smart card including a semiconductor chip, such as a microchip, for storing and processing information on a smart card, an optical linkage for making a non-physical contact between the smart card and a remote reader/transmitter, and electronics for processing communications transmitted therebetween the smart card and the remote reader/transmitter. The smart card and the remote reader/transmitter are capable of data exchange therebetween utilizing this optical linkage, or optical serial interface. The optical linkage between the smart card and the remote reader/transmitter includes a sensor pad formed on the smart card capable of receiving data and pulsed coherent light from the reader/transmitter. The pulsed light is converted into power for operation of a light source and electronics, thus permitting transmission of responsive data contained on the microchip to the remote reader/transmitter.

The electronics are mounted in the smart card and connected to an input/output terminal of the microchip for reading information contained thereon and writing information thereto, and are further connected to the input/output terminal of the optical linkage for receiving and transmitting data signals in response to the information.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

FIG. 1 is an isometric view of a contactless optical smart card in accordance with the present invention;

FIG. 2 is a simplified sectional view as seen along line 2—2 of FIG. 1;

FIG. 3 is a simplified sectional view of the formation of a VCSEL light source for use in the optical smart card of the present invention;

DESCRIPTION OF THE PREFERRED EMBODIMENTS

Figure 4:
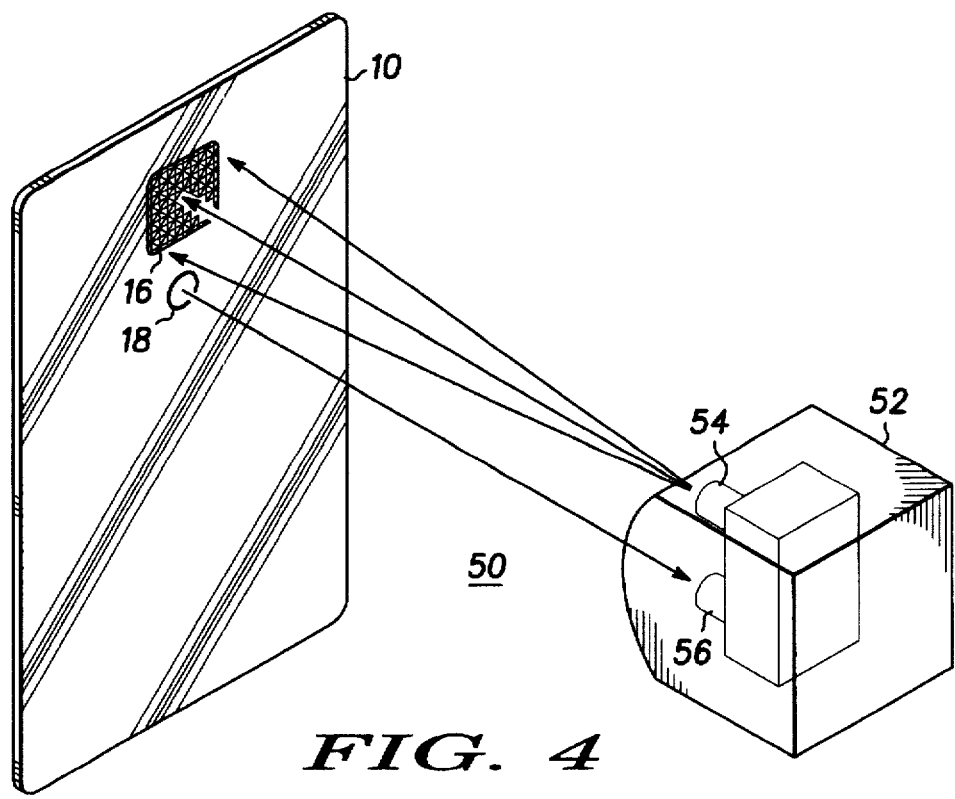
FIG. 4 is an isometric view of a contactless optical smart card in accordance with the present invention, illustrating use with a remote reader/transmitter and the light paths generated therebetween.

Turning now to the drawings, FIGS. 1 and 2 illustrate a specific embodiment of an optical smart card 10 in accordance with the present invention. Optical smart card 10 includes a smart card 10 having contained therein a semiconductor microchip 14 capable of storing and processing information, a optical sensor pad 16, such as an optical holographic light guide, capable of collecting coherent light beams from a remote reader/transmitter, a light source 18 for the transmission of responsive information between smart card 10 and the remote reader/transmitter, and electronics 20 interfacing with microchip 14, light source 18 and sensor pad 16. Microchip 14 further includes a data input terminal and a data output terminal (not shown) capable of receiving and transmitting information to and from microchip 14.

It should be understood that smart card 10 is fabricated so as to be dimensionally thin and portable, thus easily carried by the owner in a wallet, shirt pocket, or the like. In this particular embodiment smart card 10 includes a housing 22 having microchip 14, encapsulated therein. Generally microchip 14 contains a secure HC05 microcontroller encapsulated in the plastic material which makes up smart card 10. The processor of microchip 14 is designed to be secure against any violation, such as removing the cap portion, and can only be accessed via the optical interface. Microchip 14 is programmed at the factory and includes secure fuses which are blown upon tampering. Sensor pad 16 is partially mounted in housing 22 so as to be capable of receiving pulsed coherent light from the remote reader/transmitter. Light source 18 serves as the transmission device, either directly sending a single pulse, or sending an encoded transmission onto an area using a light guide. In general, light guides move light out into a unique pattern spatially or temporally. A simple CCD camera detector, a broad area detector or a detector array, serving as the remote reader/transmitter, can read the patterns as a way of verifying the exchange. Electronics 20 generally include a central processing unit (CPU) and memory (RAM or ROM) capable of working with the CPU, sensor pad 16, light source 18 and microchip 14.

In a preferred embodiment, microchip 14 is directly connected to the CPU in electronics 20. Alternatively, the CPU is included as a part of microchip 14. The CPU is programmed to interface with the memory and circuitry on microchip 14 and provide and process information stored on and/or transmitted to microchip 14, thus smart card 10, to activate light source 18 in response thereto. It should be understood that while this particular embodiment describes the encapsulation of the various components, it is anticipated the various components may actually be "sandwiched" between two planar pieces of material comprising smart card 10.

In general, microchip 14 is only capable of sending and receiving information to and from the remote reader/transmitter through sensor pad 16 and light source 18. Although, it should be understood that in some specific instances a certain amount of communication with the electronics on the smart card may be desired or even necessary and, in these instances, a user interface (not shown) is constructed to communicate information to microchip 14 from the CPU, as well as communicating information from the microchip 14 to the CPU. The user interface is provided to allow the user to communicate with the CPU and, ultimately, microchip 14 and light source 18. The user interface would include various buttons and controls for operating light source 18. In addition, there may be associated with the user interface a security device or security circuit which generally will allow operation of smart card 10 only in response to some secret information known only to the smart card owner, e.g. a PIN number, biometric input, etc. To this end, the user interface may include one or more buttons, such as an alphanumeric input device, a small trackball or pointer device, a miniature joystick, a biometric input device, or the like, which must be properly operated by the user to activate smart card 10. In the simplest form, there may be provided a biometric input device, such as a touch sensitive display panel, that is capable of identifying the user when the user simply grasps the smart card having his individual finger(s) positioned over the touch sensitive display panel.

In this specific embodiment, light source 18 includes a vertical cavity surface emitting laser (VCSEL) utilized because of the extremely small size that can be achieved and because of the simplicity of construction, operation and packaging. It will of course be understood that other light sources may be utilized, including but not limited to light emitting devices (LEDs), organic light emitting diodes, etc. or any other type of light source capable of serving as an optical serial interface. Light source 18 includes, for example, semiconductor electronics driven by data processing circuits. The data processing circuits include, for example, logic and switching circuit arrays for controlling light source 18. The data processing circuits include, in addition to or instead of the logic and switching arrays, a microprocessor or similar circuitry for processing input signals of software instructions to activate light source 18.

Disclosed in the preferred embodiment is the use of a vertical cavity surface emitting laser (VCSEL) as light source 18. As previously stated, in this particular embodiment, a VCSEL is chosen as the wireless communication light source 18 for smart card 10 instead of a light emitting device (LED), due to the extremely small size and the energy efficiency of the VCSEL, a great importance to portable electronic equipment. In addition, by utilizing a laser as light source 18, there is provided an upgrade route for future high speed communication requirements. In comparison to radio frequency (RF) communication links, laser communications possess more advanced security advantages. In choosing a VCSEL as an IrDA compatible data link for smart card 10, either a high power 850 nm VCSEL or a low power VCSEL array can be used with a diffuser made of either a negative lens or an optical hologram, to spread the beam into a cone of 15°–30° half angle. A total power of at least 20 mw at a typical 25% duty ratio is required. The upper power limit is dictated by the eye safety requirement, which is above 300 mw at a 25% duty ratio. In most instances, the diffuser will be molded onto smart card 10. Alternatively, a visible VCSEL can be used for light source 18, for data communication purposes. In that the light emitted is visible, no diffuser will be required for aiming. Less power will be needed in this instance because of the smaller receiving cone requirements. For example, assuming 4 mw/cm$^2$ receiving sensitivity and up to 1 m receiving distance, only 2 mw of power will be required for a typical laser with a full width at half maximum divergence angle of 10°–15°. Referring now to FIG. 3, illustrated is the fabrication of a VCSEL 30 for use as light source 18 of the present invention. As illustrated, VCSEL 30 is formed of a plurality of layers formed on a major surface of a substrate 32.

It should be understood that this is just a representation of one VCSEL structure and there can be many of these structures located on the substrate to form an array. It should be further understood that other applications could be used for the fabrication of VCSEL 30 of this invention such as etching of trenches of the like. In general, VCSEL 30 is formed by depositing a plurality of layers on substrate 32 and then etching the layers down to substrate 32 to form VCSEL 30. Further information on the formation of VCSELs according to this method can be found in U.S. Pat. No. 5,034,092, entitled "PLASMA ETCHING OF SEMICONDUCTOR SUBSTRATES", issued Jul. 23, 1991, assigned to the same assignee and included herein by this reference.

Substrate 32 is made of undoped gallium arsenide. Gallium arsenide is illustrated as used for substrate 32 to facilitate epitaxial growth of multiple layers of high and low aluminum concentrations of gallium arsenide and aluminum arsenide, such as $Al_{0.85}GaAs$ and $Al_{0.15}GaAs$. It should be understood that other semiconductor substrates could be used as well.

Epitaxial deposition of multiple alternate layers of different compositions is accomplished by well known techniques in the art such as MBE, MOCVD, or the like. These techniques enable epitaxial deposition of relatively thin and thick layers of a variety of material such as gallium arsenide, aluminum gallium arsenide, aluminum arsenide, silicon or the like. Fabrication of VCSEL devices use epitaxial deposition extensively to produce the multitude of layers of different materials which make up the device. It should be understood that VCSEL 30 is fabricated to emit light in an overall range from 350 nm to 2000 nm, more specifically, visible light in a range of 350 nm to 750 nm and/or infra-red light in a range of 750 nm to 2000 nm, dependent upon the specific application. More specifically, VCSEL 30 can be fabricated to emit light in a visible range of blue, green, red, when utilizing active layers of indium gallium nitride (InGaN), or utilizing indium gallium aluminum phosphide (InGaAlP), to achieve light in a red range. In addition, VCSEL 30 can be fabricated to emit infra-red light, utilizing gallium arsenide (GaAs), indium gallium arsenide (InGaAs), and/or indium gallium arsenide phosphide (InGaAsP), to emit light in an infra-red range.

By way of example, VCSEL 30 is fabricated by epitaxial deposition of alternating layers or films of silicon doped aluminum gallium arsenide (AlGaAs) 35, with a low fraction aluminum (Al), and aluminum gallium arsenide (AlGaAs) 36, with a high fraction aluminum (Al), more specifically silicon doped $Al_{0.15}Ga_{0.85}As$ and $Al_{0.85}Ga_{0.15}As$, on a major surface 33 of substrate 32. Deposition of alternating layers of doped aluminum gallium arsenide 35 and 36 form a first set of reflectors or mirror stacks 34 for the VCSEL device. Optical thickness of the alternating layers of aluminum gallium arsenide 35 and 36 are set at one quarter of a wavelength at which the device is designed to operate. Generally, reflectivity of a VCSEL mirror stack is increased by increasing the number of alternating mirror stack layers.

Cladding region 37 is epitaxially deposited on multiple layers of aluminum gallium arsenide 35 and 36. Cladding region 37 typically has two parts which are not shown to avoid overcrowding of the figure. First a silicon doped aluminum gallium arsenide layer is deposited on the first reflector stack. Second, an undoped aluminum gallium arsenide layer is deposited on the silicon doped aluminum gallium arsenide layer.

Active region 38 is epitaxially deposited on cladding region 37. Active region 38 is commonly made of two barrier regions (not shown) which are deposited on either side of a central quantum well region. The two barrier regions are made of approximately 100 angstroms each of undoped aluminum gallium arsenide. The quantum well region is generally made of undoped gallium arsenide with an approximate thickness of 80 angstroms.

A second cladding region 39 is epitaxially deposited on active region 38. Cladding region 39 is commonly made of two parts (not shown). First, undoped aluminum gallium arsenide is deposited on active region 38. Second, carbon doped aluminum gallium arsenide is deposited on the undoped aluminum gallium arsenide. It should be understood that the alternative p-dopants, such as beryllium and zinc can also be used.

A second reflector or mirror stack 40 is epitaxially deposited on second cladding region 39. The second reflector region is composed of alternating layers of carbon doped aluminum gallium arsenide 41, with a low fraction of aluminum, and aluminum gallium arsenide 42, with a high fraction of aluminum, more specifically, carbon doped $Al_{0.85}Ga_{0.15}As$ and $Al_{0.15}Ga_{0.85}As$. Generally, optical thickness of the last alternating layer is one-half wavelength instead of one-quarter wavelength as is used for the other alternating layers.

A metal layer 43, typically made of titanium, platinum, gold, or nickel is deposited on the last of the alternating layers 41 and 42. Metal layer 43 is fabricated so that geometric patterns are formed by using a common liftoff process. It should be understood that other masking structures and methods could be used to fabricate geometric patterns such as photoresist, dielectrics, or the like. Metal layer 43 once patterned serves as an etch mask for etching the exposed alternating layers. A layer 44 of traditional metal is applied to the lower surface of substrate 32 to form a lower electrical contact.

After epitaxially depositing a multitude of layers on substrate 32, the VCSEL structure is defined with metal layer 43, and is etched. After the etching is complete, a VCSEL structure, is obtained, capable of emitting light in a range dependent upon the particular materials utilized in the fabrication of VCSEL(s) 30, as previously described.

An alternative method of fabricating VCSEL 30 is disclosed in U.S. Pat. No. 5, 258,316, entitled "PATTERNED MIRROR VERTICAL CAVITY SURFACE EMITTING LASER", issued Nov. 2, 1993, assigned to the same assignee, and included herein by this reference. Disclosed is the formation of a VCSEL by defining an operating area in the second reflector or mirror region 40 to form a trench surrounding the operating area and extending the depth of the trench sufficiently to reduce reflectivity below an amount required to support lasing in a volume of the laser between the trench and the active layer.

While specific sequences of steps have been disclosed in the fabrication of VCSEL 30, it will be understood by those skilled in the art that many of the steps are interchangeable, and the exact sequency utilized depends upon the specific methods applied, including chemicals, temperatures, etc. The growth techniques will most likely be MOCVD, although other techniques such as CBE, MBE or MOMBE could be utilized. It should be understood that neither the sequence disclosed nor claimed is intended to in any way limit the present invention to a specific sequence of steps for the formation of smart card 10 more specifically light source 18.

Referring now to FIG. 4, illustrated is the optical smart card 10 of the present invention in relation to a remote reader/transmitter 52. Generally, during operation, the user or holder of optical smart card 10 "waves" the card in front of remote reader/transmitter 52. Remote reader/transmitter 52 remains activated to submit coherent light beams, as illustrated by the outgoing directional arrows from an output 54, as well as the transmission of encrypted information if programmed as such. Sensor pad 16 acting as a detector/ collector, receives the light beams, which are processed by the CPU, thereby activating light source 18 to submit communicative transmissive responses, as illustrated by the directional arrows, back to an input 56 of remote reader/ transmitter 52. Data can be transmitted between remote reader/transmitter 52 and smart card 10 by single encoded optical pulse train or encoded onto an area using a light guide (previously described). The transmission of information is achieved by a contactless optical interface between smart card 10 and remote reader/transmitter 52. This contactless interface results in a system of automated fair collection, or the like, that is efficient as well as secure. Because this exchange of information is optical, remote unauthorized access of information or data contained on the card is virtually impossible, in that the user or holder of smart card 10 can secure this information by simply placing smart card 10 into an envelope type sleeve, a shirt pocket, or the like.

Figure 5:
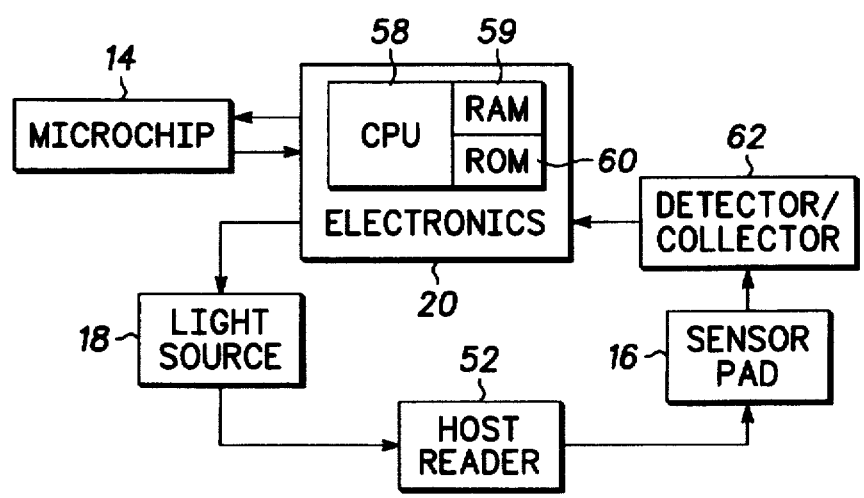
FIG. 5 is a block diagram of the contactless optical smart card of the present invention.

Turning now to FIG. 5, a simplified block diagram of optical smart card 10 is illustrated. In this specific embodiment of optical smart card 10, a central processor unit (CPU) 58 is illustrated as a part of electronics 20, using a random access memory (RAM) 59 and a read only memory (ROM) 60. In this preferred embodiment an MC68HC05SC21 available commercially from MOTOROLA, INC. is utilized as CPU 58. It should be understood that while CPU 58 is described as being a part of electronics 20, microchip 14 may contain a separate CPU for microprocessing capabilities, in addition to electronics 20.

It will of course be understood that RAM 59 and ROM 60 can be internal to CPU 58 and/or external memories can be provided for additional or specialized features. CPU 58 is interfaced with microchip 14, capable of storing and/or processing information for smart card 10

Remote reader/transmitter 52, is illustrated interfaced with sensor pad 16, to which it submits coherent light beams as well as encrypted data communication transmissions. Sensor pad 16 has positioned as a part thereof, a detector/collector 62 which serves to further transmit the light received by sensor pad 16 to electronics 20. Once activated, CPU 58 processes information from microchip 14 and submits a responsive transmissive signal using light source 18 to remote reader/transmitter 52.

Thus, new and improved apparatus for contactless interfacing with information stored on a smart card is disclosed. The new and improved apparatus is fabricated so as to place an optical interface within the smart card itself. Advanced light source packaging and sensor pad packaging are utilized to provide for the optical serial interface. Also, the new and improved apparatus for interfacing with information stored on a smart card is easy to operate so that each smart card owner can easily make a non-physical, directionally independent contact with a remote reader/transmitter device, thereby transmitting information between the smart card and the remote reader/transmitter.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A smart card comprising:

a microchip embedded within the smart card, having a data input terminal and a data output terminal, and capable of storing dataelectronic information thereon;

a sensor pad, including an optical hologram embedded within the smart card, capable of collecting and detecting coherent light beams and dataelectronic information submitted by a remote reader/transmitter device;

a light source embedded within the smart card, capable of transmitting responsive data therebetween the smart card and the remote reader/transmitter device; and electronics mounted in the smart card and connected to the sensor pad for receiving the coherent light beams and the dataelectronic information from the remote reader/transmitter device, the electronics further connected to the data input terminal and data output terminal of the microchip for transmitting and receiving the dataelectronic information, and further connected to the light source for supplying data thereto the remote reader/transmitter device in response to the dataelectronic information stored thereon the microchip.

2. A smart card as claimed in claim 1 wherein the light source is at least one vertical cavity surface emitting laser (VCSEL).

3. A smart card as claimed in claim 2 wherein the at least one vertical cavity surface emitting laser (VCSEL) is fabricated to emit infra-red light in a range of 750 nm to 2000 nm.

4. A smart card as claimed in claim 2 wherein the at least one vertical cavity surface emitting laser (VCSEL) is fabricated to emit visible light in a range of 350 nm to 750 nm.

5. A smart card as claimed in claim 1 further including at least one of an alphanumeric input device and a biometric input device connected to the data input terminal of the microchip.

6. A smart card as claimed in claim 1 wherein the electronics includes a central processing unit (CPU) and a random access memory (RAM).

7. An optical smart card comprising:

a microchip at least partially embedded within the smart card, having a data input terminal and a data output terminal, and capable of storing dataelectronic information thereon;

an optical hologram embedded within the smart card, capable of collecting and detecting coherent light beams and dataelectronic information submitted by a remote reader/transmitter device;

a vertical cavity surface emitting laser (VCSEL) embedded within the smart card, capable of transmitting responsive data therebetween the smart card and the remote reader/transmitter device; and electronics mounted in the smart card and connected to the optical hologram for receiving the coherent light beams and the dataelectronic information from the remote reader/transmitter device, the electronics further connected to the data input terminal and data output terminal of the microchip for transmitting and receiving the dataelectronic information, and further connected to the vertical cavity surface emitting laser (VCSEL) for supplying data thereto the remote reader/transmitter device in response to the dataelectronic information stored thereon the microchip.

8. An optical smart card as claimed in claim 7 wherein the vertical cavity surface emitting laser (VCSEL) is fabricated of a plurality of epitaxially grown layers.

9. An optical smart card as claimed in claim 8 wherein the vertical cavity surface emitting laser (VCSEL) is fabricated to emit visible light in a range of 750 nm to 2000 nm.

10. An optical smart card as claimed in claim 8 wherein the vertical cavity surface emitting laser (VCSEL) is fabricated to emit infra-red light in a range of 350 nm to 750 nm.

11. An optical smart card as claimed in claim 8 further including safety features to prevent unauthorized access of information contained on the microchip.

12. An optical smart card as claimed in claim 8 wherein the electronics includes a central processing unit (CPU) and a random access memory (RAM).

* * * * *